Aug. 17, 1926.

W. H. SPIRE 1,596,029

METHOD OF MANUFACTURING DRAG LINK SOCKETS

Filed March 26, 1923

INVENTOR:
WILLIAM. H. SPIRE
BY
ATTORNEY.

Patented Aug. 17, 1926.

1,596,029

UNITED STATES PATENT OFFICE.

WILLIAM H. SPIRE, OF CLEVELAND, OHIO, ASSIGNOR TO THE STEEL PRODUCTS COMPANY, OF CLEVELAND, OHIO, A CORPORATION OF OHIO.

METHOD OF MANUFACTURING DRAG LINK SOCKETS.

Application filed March 26, 1923. Serial No. 627,655.

My invention relates to methods of forming the ball-receiving keyhole slots in the socket portions of drag links. The objects of my invention are to design a drag link which is reinforced at the portions thereof normally weakened by the ball receiving slot, and to provide a method of manufacture in which the reinforcements are provided in the slot forming operation.

Figs. 6 to 10 inclusive show a modified form of link.

Figure 1:
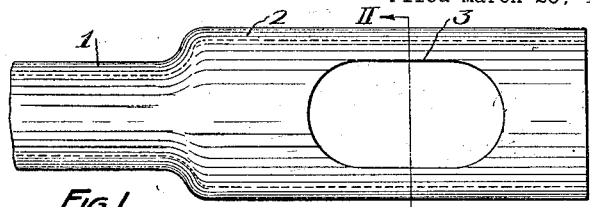
Figure 1 is a plan view of the tubular drag link showing the slot initially formed in the tubing.
Figure 2:
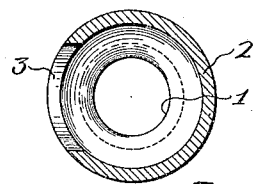
Fig. 2 is a section on line II—II of Fig. 1.
Figure 3:
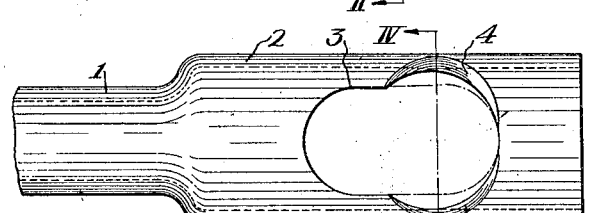
Fig. 3 is a plan view of the completed link.
Figure 4:
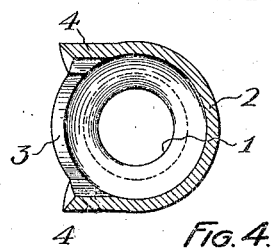
Fig. 4 is a section on line IV—IV of Fig. 3.
Figure 5:
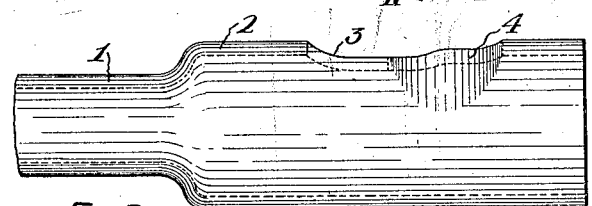
Fig. 5 is a side elevation of the completed link.
Figure 6:
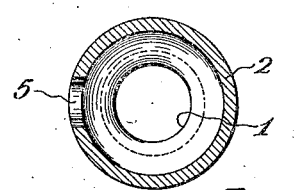

Fig. 6 is a plan view of the tubular drag link showing the slot which is initially formed therein.

Figure 7:
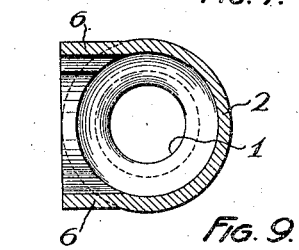

Fig. 7 is a section on line VII—VII of Fig. 6.

Figure 8:
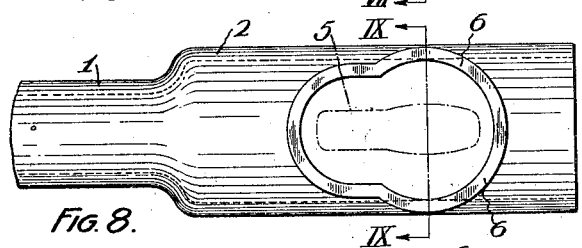

Fig. 8 is a plan view of the completed link.

Figure 9:
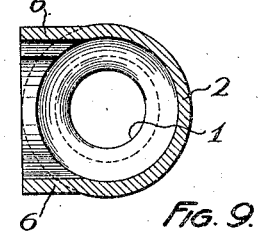

Fig. 9 is a section on line IX—IX of Fig. 8.

Figure 10:
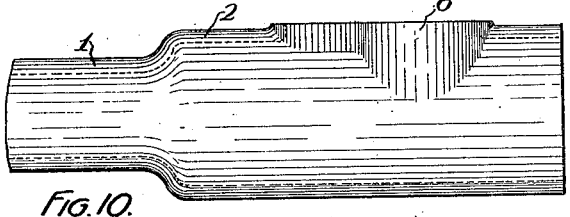

Fig. 10 is a side elevation of the completed link.

Referring to the annexed drawings, in which the same numerals refer respectively to the same parts in the several views, my improved drag link comprises a piece of steel tubing 1 which has been upset and expanded in a forging machine so as to form the end sockets 2 having an outside diameter materially greater than the original tubing 1. In drag links of the type herein described a keyhole slot is formed in the enlarged portion 2 to permit the insertion of the ball end of the connecting arm. The enlarged portion of this slot is of substantially the same diameter as the inner diameter of the enlarged portion 2. The cutting of such a large aperture in the cylindrical wall of the link materially weakens the link at this point since the cut extends through nearly half the circumference. In forming the slot by my improved method I first cut, by means of a suitable punch, a slot 3 of substantially uniform width throughout. I then expand a portion of the slot by means of a suitable forming die which engages the metal at the edge of the slot and bends the wall of the tube outwardly at the side edges of the slot forming arcuate flanges 4 whose inner surfaces form segments of a cylinder the axis of which is at right angles to the axis of the tube 1. The expanded portion of the slot 3 is thus widened to substantially the inner diameter of the enlarged portion 2 without cutting away the wall of the link more than necessary for the narrow portion of the slot, and the link is effectively reinforced by the flanges 4 at the point which in prior structures is the point of greatest weakness.

In the slightly modified form shown in Figs. 6 to 10 inclusive, I punch out in the first operation a much narrower slot 5 which is slightly enlarged at the end which is to form the ball entering portion. The edge of the slot is then turned up throughout the entire extent thereof to form a slot of the desired contour and size. The original slot 5 is so formed that when the forming operation is completed the edge of the marginal flange 6 surrounding the finished slot will lie substantially in a plane tangential to the outer surface of the cylindrical end 2 of the link.

What I claim is:

The method of forming the keyhole ball-receiving slot in a tubular metal drag link, which comprises, forming a longitudinal slot in said tube the width of which is less than the internal diameter thereof; and expanding a portion of said slot to substantially the same diameter as the inner diameter of the tube by bending the wall of the tube outwardly at the edge of the slot to form arcuate flanges providing a cylindrical ball entering portion the axis of which is at right angles to the axis of the tube.

Signed by me this 16th day of March, 1923.

WILLIAM H. SPIRE.